United States Patent

Gantschnigg et al.

[15] 3,650,180
[45] Mar. 21, 1972

[54] COMPOUND HYDROSTATIC BEARING FOR ROTARY RADIAL PISTON HYDRAULIC MACHINES

[72] Inventors: Gottfried K. Gantschnigg; Richard F. Wameling, both of Annapolis, Md.
[73] Assignee: Arinc Research Corporation, Annapolis, Md.
[22] Filed: Sept. 30, 1969
[21] Appl. No.: 862,293

[52] U.S. Cl. .................................................. 91/488, 92/588
[51] Int. Cl. ............................................................ F01b 13/06
[58] Field of Search ..................... 91/486, 488, 489; 60/53 B; 92/58

[56] References Cited

UNITED STATES PATENTS

| 2,449,297 | 9/1945 | Hoffer | 308/9 |
| 2,106,860 | 2/1938 | Tibbetts | 308/9 X |
| 2,372,523 | 3/1945 | Sinclair | 91/486 |
| 2,566,080 | 8/1951 | Davids | 308/9 X |
| 2,862,456 | 12/1958 | Bauer | 91/488 |
| 2,699,123 | 1/1955 | Bonnette et al. | 91/498 |
| 2,827,859 | 3/1958 | Crane | 91/486 |
| 3,188,973 | 6/1958 | Firth et al. | 91/488 |
| 3,223,046 | 12/1965 | Eickmann | 91/488 |

FOREIGN PATENTS OR APPLICATIONS

| 819,570 | 4/1958 | Great Britain | 60/53 |

Primary Examiner—William L. Freeh
Attorney—Stevens, Davis, Miller & Mosher

[57] ABSTRACT

A compound hydrostatic bearing for use in radial piston machines, such as hydraulic motors, pumps, transmissions and the like which operate at high speeds and under high fluid pressures comprising a bearing race which reacts the radial piston forces and rotates free with the cylinder block on a pressurized fluid film in the stationary housing. Swivel mounted pads, at the top of the pistons, transmit the radial forces of the pistons in the bearing race and adjust themselves for misalignment due to housing displacement. Friction between the pads and the bearing race provide the force to rotate the race with the cylinder block. Pressurized fluid is supplied through passages in each piston to a recess on top of the associated pad. The size of the recess is equal to the cylinder area, and therefore the force due to the pressure in the recess is a reacting force from the pressure in the cylinder. Pressurized fluid from the pad recess is then supplied through orifices to recesses at the outer side of the multirecess bearing ring providing pressurized lubrication to the bearing surfaces. Spacing of the race orifices and recesses is arranged so that at any displacement of the bearing housing and at any position of the pads, one or two race recesses communicate with a pad recess. The size and location of a recess is selected to react and damp bearing loads with the pressurized lubricating fluid.

4 Claims, 7 Drawing Figures

INVENTORS
GOTTFRIED K. GANTSCHNIGG
RICHARD F. WAMELING

BY
Stevens, Davis, Miller & Mosher
ATTORNEYS

INVENTORS
GOTTFRIED K. GANTSCHNIGG
RICHARD F. WAMELING

INVENTORS
GOTTFRIED K. GANTSCHNIGG
RICHARD F. WAMELING

BY Stevens, Davis, Miller & Mosher
ATTORNEYS

COMPOUND HYDROSTATIC BEARING FOR ROTARY RADIAL PISTON HYDRAULIC MACHINES

BACKGROUND OF THE INVENTION

1. The Field of Invention

The present invention relates to a compound hydrostatic bearing for use in radial piston machines, such as hydraulic pumps, motors, transmissions, and the like, wherein the high radial forces of the pistons must be reacted at high speeds and with a minimum of frictional bearing resistance. The basic concept of a hydrostatic bearing is that an external source of compressed fluid provides a pressurized lubrication film to the bearing surfaces thus separating the contact areas and preventing metal-to-metal contact at any speed. The inventive hydrostatic bearing comprises two hydrostatic bearings wherein a first bearing between a pad and the inside of the race reacts to the high radial forces of the individual pistons, at low relative speed between the bearing surfaces, and the second bearing between the outside of the race and the inside of the wobbler reacts to the vector forces from the first bearing, at high relative speeds between the bearing surfaces.

2. Description of the Prior Art

Bearings that exhibit primarily rolling friction are known as rolling-element bearings. Examples are the ball, roller, and needle bearings. Rolling-element bearings generally consist of two races (inner and outer), a set of rolling elements (balls, rollers, or needles) between the races, and a separator for keeping the set of rolling elements equally spaced.

When the bearing friction is essentially sliding friction, the bearing is called a sliding bearing. Lubrication of a sliding bearing may be such that the bearing surfaces are separated by the creation of a load-carrying continuous fluid film. When this condition is present, the lubrication is referred to as either hydrodynamic or hydrostatic. Hydrodynamic lubrication requires relative motion of the bearing surfaces to generate the load-reacting lubricant pressures. The magnitude of the lubricant pressures is a function of the relative speed of the bearing surfaces. When relative speeds of the bearing surfaces are low or the loads are high, hydrodynamic lubrication may not be possible.

In contrast to hydrodynamic bearings, in which the lubricant pressure is generated within the bearing by relative motion between bearing surfaces, the hydrostatic-bearing lubricant pressure is generated at an external source and fed into the bearing. A rotary radial piston hydraulic machine, because it has the potential for providing a pressurized lubrication source that is external to the bearing, is an ideal application for the hydrostatic bearing.

A hydrostatic bearing in its simplest form consists of a pad and runner. The pad in turn incorporates three basic elements, the recess, sill, and restrictor. Pressurized fluid is fed through the restrictor into the recess. When the product of the recess pressure and the recess area becomes greater than the load holding the pad and runner together, the pad and runner will separate and fluid will flow from the source through the restrictor and recess and out over the sill, thus establishing the load-carrying fluid film. The thickness of the fluid film is determined by the bearing supply pressure, restrictor size and type, fluid type and temperature, recess and sill areas, and applied load. If the applied load ever exceeds the maximum supply pressure at zero flow, the pad and runner will seat, metal-on-metal rubbing will occur, and damage may result.

The above type of bearing is known as shown, for example, in U.S. Pat. Nos. 3,223,046 and 3,255,706 to Karl Eickmann and U.S. Pat. Nos. 3,225,701 and 3,295,459 to Raymond C. Griffith. However, these bearings have not proved to be completely satisfactory for all types of operation.

A known hydrostatic-bearing consisted of nine simple hydrostatic bearings (one for each piston pair) incorporating a shrink-fitted steel-ring insert as the runner, together with individual bearing pads. It was impossible to achieve pad/runner separation against high centrifugal loads with this arrangement. Without separation, there would be metal-to-metal contact during relative motion. A load analysis revealed that under certain operating conditions the product of the relative sliding velocity between surfaces and the surface-contact bearing pressure (PV factor) would be excessively high. A hybrid bearing pad that would utilize both hydrodynamic and hydrostatic lift forces was then considered. This approach was abandoned because at maximum input speed, where the centrifugal load is greatest and the hydrodynamic effect is needed most, the relative speed between the cylinder block and motor wobbler was only 20 r.p.m. This speed differential is too small to generate the required hydrodynamic lift.

The present invention overcomes this defect by having the ring insert free to rotate, and an array of hydrostatic recesses located around the periphery of the ring. Pressurized fluid is fed into recesses located at the pad surfaces; it acts on the recess area to partially support the applied radial load. Thus, the pad is a hydrostatic bearing but is specifically designed to operate with zero fluid-film thickness (metal-to-metal contact with the ring). The pressurized fluid is supplied to the ring recesses from the pad recesses through appropriate restrictors located in the ring. Each pad recess communicates at all times with at least one of these ring-recess feed restrictors. Fluid pressure acts on the ring-recess areas located at the ring periphery to support the vector sum of the applied loads from all of the piston/pad assemblies. Here, the applied load is completely supported, and a pressurized fluid film at the ring periphery prevents metal-to-metal contact between ring and wobbler. This bearing is called a compound hydrostatic bearing because there are actually two hydrostatic bearings in the same fluid series circuit.

The relative motion of the pads with respect to the ring is due to the wobbler eccentricity and is oscillatory. The relative sliding velocity between these parts, a function of eccentricity magnitude and input speed, is considerably lower than that for the case in which the ring was fixed. Because of this lower velocity, together with the partial reaction of the applied bearing load and the availability of good boundary lubrication, the interface PV factor is small and wear should be negligible.

At start-up and very low initial input speeds some piston/pad assemblies will be retracted because of their weight. As the cylinder block accelerates, the centrifugal force of the piston/pad assemblies increases until it is sufficient to move the assemblies radially outward against the ring. After all piston/pad assemblies of the pump and motor elements have been forced into contact with the ring, system charge pressure will increase to supply pressurized fluid to the compound hydrostatic-bearing system.

The invention will be described embodied in a variable speed, radial piston, hydraulic transmission, the purpose of which is to convert variable input speed to a constant output speed or vice versa. It consists of a cylindrical-shaped cylinder block having a series of radial cylinders with pistons therein. The block is rotated at the input speed of the transmission in a stationary, offcenter positioned, cylindrical housing to provide alternate radial motion of the pistons during rotation, thus acting as a pump or motor element. The radial forces of the pistons create high frictional loads in the contact areas between the moving piston heads and the stationary housing.

To reduce this friction to a minimum, rolling bearing elements are usually used wherein the radial piston forces are reacted by an inner race of the bearing which rotates with the cylinder block. The high speed of the rolling elements in this large size bearing creates a problem due to the drag load and friction causing wearout of the bearing parts and contamination of the hydraulic fluid.

A known hydraulic transmission is the Sunstrand Constant Speed Drive Model 120 RD 02 which consists of a variable displacement hydraulic pump whose volume of oil output can be controlled, a constant displacement hydraulic motor which turns faster or slower as the pump forces more or less fluid into it, and a governing system which controls the rate of flow from the pump and thereby controls the speed of the motor.

The transmission is made up of a pump and motor element consisting of a cylinder block with a plurality of radial pump and motor pistons and a variable displacement pump wobbler assembly with a roller bearing and a constant displacement motor wobbler assembly with a roller bearing.

Suitable valving between the pump and motor is provided to enable the pump fluid to work and to enable charge fluid to fill the cylinders. The rate of flow is determined by the position of the variable displacement pump wobbler assembly.

A major problem of any radial piston hydraulic transmission is to react or absorb the high radial forces of the pistons and to reduce friction between the rotating piston heads and the wobbler to a minimum. In a hydraulic transmission with roller bearings in the wobblers, the radial forces of the pistons are reacted at the inner race of the roller bearings which, due to friction at the piston heads, rotates with the variable speed of the cylinder block in the stationary pump wobbler or in the constant speed motor wobbler.

Drag load and friction in the high speed roller bearing cause a high failure rate of the unit due to wearout of the bearing elements, the pistons, and contamination of the fluid.

SUMMARY OF THE INVENTION

The principle objects of this invention are:

1. To eliminate the rolling elements in the bearings by providing a hydrostatic lubricated sliding bearing system between the inner race and the wobbler which does not require any source of compressed fluid other than the pressurized fluid in the unit.

2. To provide pads with hydrostatic lubrication between the pad and the inner race that are pivotally interconnected with the top of either one or two pistons and having a spherical shape bearing surface for self-alignment with the spherical bore of the inner race.

3. To provide a race with multiple recesses at the outside surface for hydrostatic lubrication by a pressurized fluid film between the race and the wobbler where the pressurized fluid is supplied from the cylinders through suitable ports and restrictors in the pistons, pad and race to swivel joints, the recesses in the pads, and the recesses in the race.

4. To locate and dimension the recesses, ports, and restrictors properly to control pressure, amount of flow, and to assure that the radial force of each piston pad assembly is reacted by the pressurized fluid in the adjacent recesses in the race and react at any time, pressure and operating condition.

5. Another object is that during loaded operation of the bearing, the gap between the race and the wobbler is at its minimum in the direction of the loaded side of the bearing and at its maximum at the unloaded side. Therefore, the volume of a race recess moving from the unloaded to the loaded side will decrease, thus compressing the fluid and increasing the pressure in the recess of the race. At high bearing speed this hydrodynamic effect will also assist in the hydrostatic operation.

BRIEF DESCRIPTION OF THE DRAWINGS

The means for accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

DESCRIPTION OF THE PREFERRED EMBODIMENT

Figure 1:
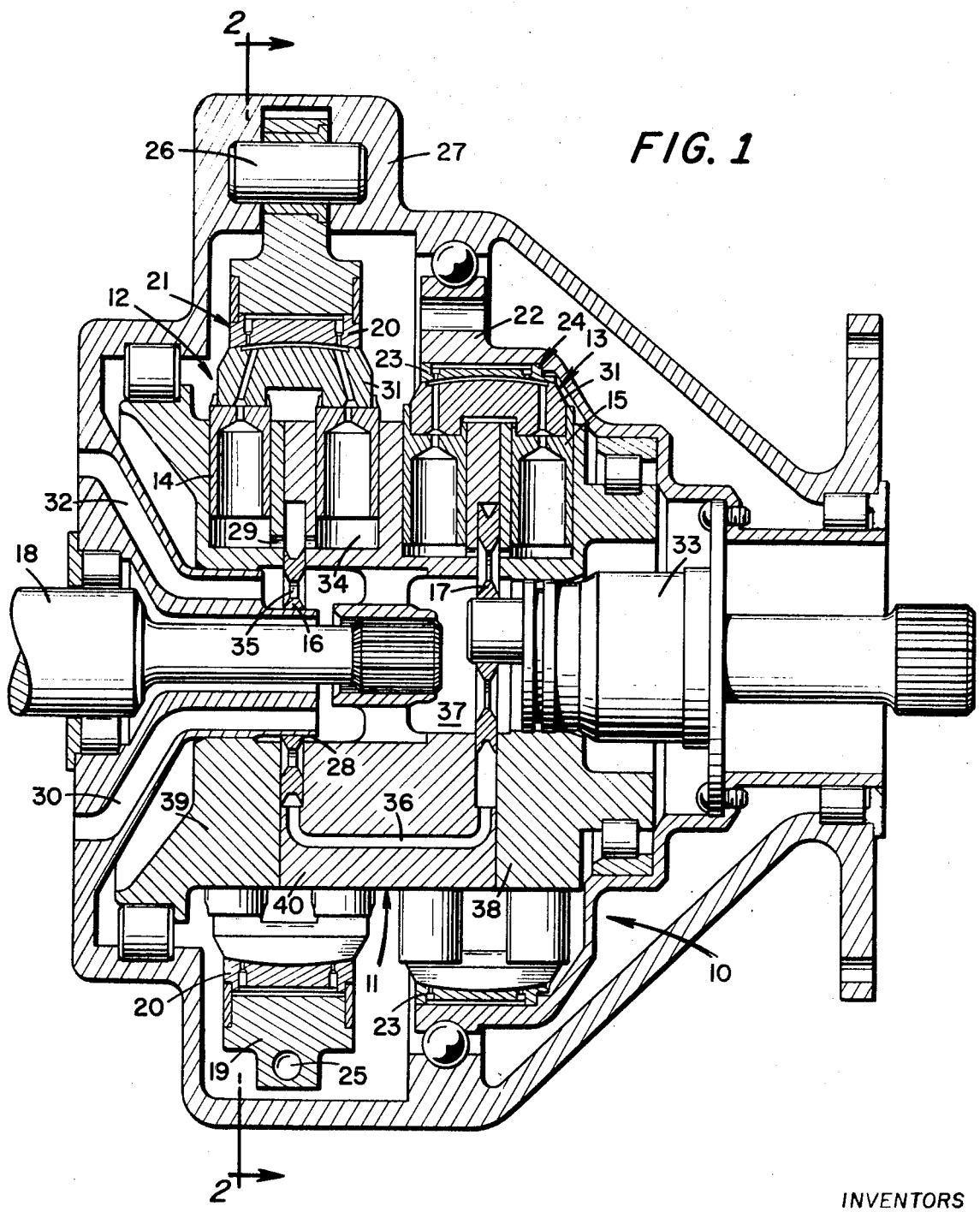
FIG. 1 shows a longitudinal cross section of a radial piston hydraulic transmission having double rows of nine pistons each in the pump element and the motor element with two valve plates separating the charge pressure from the working pressure in the pump and motor elements.

As mentioned above, the invention will be described and illustrated embodied in a constant speed drive transmission which is a hydraulically operated differential transmission used to convert variable-engine-speed rotation, for example 4,475 to 7,980 r.p.m., to constant-speed rotation, for example 8,000 r.p.m., to drive a device, such as an alternator, which has an output frequency directly proportional to the speed of rotation and therefore must be driven at a constant speed.

The transmission consists of a variable-displacement radial-piston pump whose oil-output volume can be controlled, a governing system that controls the rate of flow from the pump, and a constant-displacement radial-piston hydraulic motor whose speed of rotation depends on how much oil the pump forces into it. The pump/motor assembly 10 consists of (1) a cylinder-block assembly 11, (2) a pump-wobbler assembly 12, and (3) a motor-wobbler assembly 13. The cylinder block assembly contains the pump and motor pistons 14 and 15, respectively, and the pump and motor valve plates 16 and 17, respectively, and is driven through the input drive shaft 18. The rate of oil flow from the pump is determined by the position of the pump wobbler 19, which in turn is controlled by the governor (not shown). The pump-wobbler assembly consists of a nonrotating variable-displacement wobbler 19, an inner race 20, and the inventive compound hydrostatic bearing 21. The motor-wobbler assembly consists of a constant-displacement wobbler 22, an inner race 23, and the inventive compound hydrostatic bearing 24. During operation, the motor-wobbler assembly rotates at the desired output speed.

Common accessories, which have not been shown, include a charge pump that supplies oil to the transmission, a scavenge pump that recirculates used and surplus oil from a sump to a reservoir, a governor charge pump that supplies oil to the control system, and basic and limit governors. These devices are driven by a common accessory gear-drive assembly from the motor output. A recirculating valve, a charge relief valve, a proportional valve, and a filter may also be included as required.

The rate of flow from the pump is determined by the position of the pump-wobbler assembly 19. The position of the pump wobbler assembly, in turn, is controlled by the governor system which has not been shown but which would be attached to the pump wobbler assembly at 25, the assembly being pivotable about pivot 26 in housing 27. The governor system includes a magnetic trim device which is actuated by the frequency and load controller to provide fine control of governor action. Also included in the governor system is an overspeed sensing device for protection of the alternator from overspeed due to malfunction of the drive.

Figure 2:
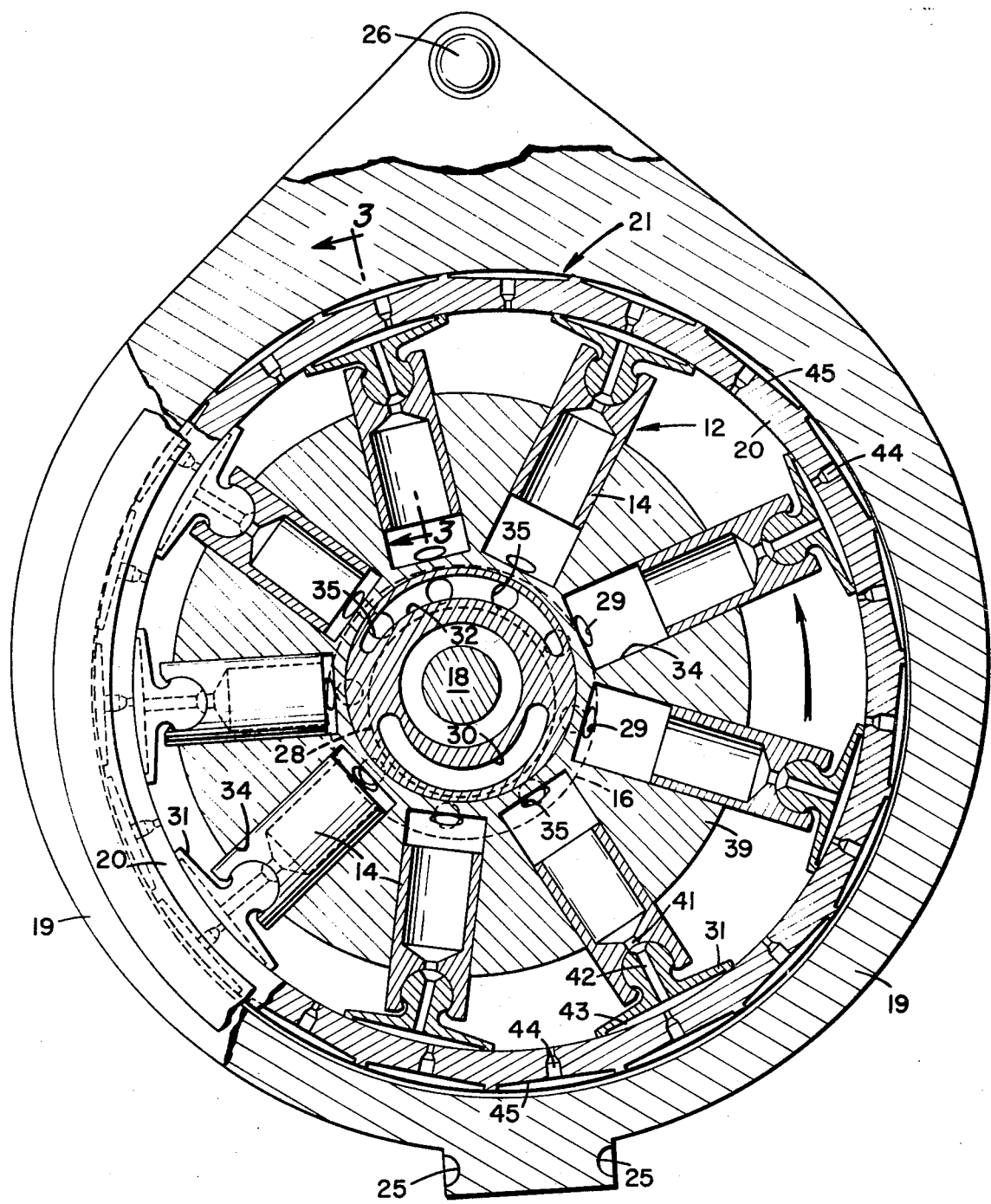
FIG. 2 is a section view taken along line 2—2 of FIG. 1 through the pump element showing one row of nine pistons of the pump element.

The elements of the variable displacement pump are shown in FIGS. 1 and 2, in which the pump wobbler 19 is offset with respect to the cylinder block 11 and the cylinder block is rotating therein. If the wobbler and block were centered with respect to each other, no oil pumping action would take place because the pump pistons would not move radially. However, if the pump wobbler is offset as shown, the pump pistons will be alternately depressed and allowed to extend as they travel around. As the pump pistons approach the "near" side of the pump wobbler, they are depressed and the oil in the cylinders 34 beneath the pistons forced out through openings 35 under high pressure to send pressurized working fluid through conduit 36 to the motor. The amount of oil displaced by this pumping action will be determined by the degree of offset of the pump wobbler. As the pistons approach the "far" side of the pump wobbler, they are extended by oil supplied to the cylinders under charge pressure through conduit 30 and the pump valve plate 16. This is the refilling action. The pistons are always in contact, through pads 31, with the pump wobbler inner race which is free to rotate with the cylinder block assembly.

To enable the pumped oil to "work" and to enable charge oil to refill the cylinder, it is necessary to have suitable valving. The pump valve plate 16 has flat sealing surfaces on both sides and is mounted on a stationary eccentric shaft 28. The valve ports 29 are located in the cylinder block surfaces which are in contact with the mating sealing surfaces of the pump valve plate. Since the valve plate is stationary and positioned eccentrically with respect to the cylinder block, the valve ports will alternately open and close as each port slides by the valve plate in its rotation. The relative position of the valve port and valve plate is such that the "working" pressure port is open and the "charge" pressure port is closed when the pump piston is being depressed. As each pump piston rotates to the "far" side of the wobbler, the working pressure port is closed and the "charge" pressure port is open, allowing charge oil to re-fill the cylinder. Oil emerging from the "working" pressure port forms an area of high pressure around the valve plate. The surface of the valve plate and outer edge of the cylinder block confine the "working" oil to this area. The inner area of the valve plate is always under charge pressure introduced through conduits 30 and 32.

The constant displacement motor 13 is of the wobbler type because it operates on an eccentric principle. The motor pistons 15 are placed to bear against the inner race 23 through the intermediary of pads 31. The action is the same; when the pistons are forced outward by the pressure of the oil, they press against a wide point on the eccentric. This wide point gives way to a narrower point and rotation is produced in the motor eccentric shaft 33. The above translation of radial thrust to rotary motion is the reverse of the action in the pump. In the motor, however, another factor must be considered relative motion. Not only is the motor eccentric rotating, but the cylinder block is also rotating. Each pair of pistons will cause 180 degree rotation of the eccentric while the cylinder block rotates 90 degrees. The eccentric will rotate faster than the cylinder block because of the added rotation produced by the action of the pistons. This is known as an overdrive condition. If no oil were pumped to the motor, the eccentric shaft and cylinder block would rotate at the same speed. Since the pistons will operate faster or slower as the amount of oil pumped to them is increased or decreased, the speed rotation of the eccentric can be controlled by regulating the oil output of the pump.

It is necessary to provide valving for the motor to deliver high pressure oil to the motor piston when the piston is in the right position to drive the eccentric. The valving must also allow circulation of charge pressure oil to the motor cylinder when the piston has completed its stroke. This is accomplished by a motor valve plate 17. The operation of the motor valve plate 17 is similar to the pump valve plate 16 in that the motor valve plate opens the ports, in the cylinder block alternately to working pressure and charge pressure. There is, however, one major difference: in the motor, the valve plate moves in relation to the cylinder block 11. Rather than being mounted on a stationary part of the drive like the pump valve plate, the motor valve plate is mounted, eccentrically, on an extension of the wobbler eccentric. As the wobbler eccentric revolves, it causes the motor valve plate to slide over the end surface of the motor cylinder block with an orbital motion. The radial thrust of the pistons is transferred to rotary motion to drive the wobbler eccentric. As the wobbler eccentric turns, the attached valve plate seals the working oil inlets; when the wobbler has advanced to a position where the narrow side is under the fully extended pistons, the valve plate will be in a position on the motor block which will permit the oil behind the pistons to circulate through a port in the motor block to the charge pressure oil, which is always in the central chamber 37.

When the input r.p.m. is less than the required output r.p.m., the drive must make up the difference in r.p.m. This is accomplished by moving the pump wobbler, in response to governor system signals, to the position where the pump will pump the required volume of oil to the motor. The action of the motor will maintain the output r.p.m. at constant speed. The difference between input and output r.p.m. depends upon the quantity of pumped oil, which, in turn, is regulated by the degree of offset of the pump wobbler. Any time the motor wobbler (output) is rotating faster than the cylinder block assembly (input) the transmission is in overdrive.

The cylinder block assembly 11 consists of three separate cylinder blocks bolted together. The motor pistons 14 and pump pistons 15 are arranged in four radial rows in the cylinder block assembly. The motor cylinder block 38 holds one row of nine motor pistons 14 and the pump cylinder block 39 holds one row of nine pump pistons 15. Between these two end cylinder blocks is the center cylinder block 40 which holds the other eighteen pistons which are both pump and motor pistons. All 36 pistons reciprocate in the cylinder block assembly 11. The pump valve plate 16 is located between the pump and center cylinder blocks 39 and 40 and is supported on stationary eccentric shaft 28. Although the pump valve plate 16 is free to rotate on the eccentric shaft 28, it does so only to reduce friction. In addition to supporting the pump valve plate, the pump eccentric shaft 28 furnishes a charge oil passage 30 and discharge oil passage 32 for fluid flow to and from the cylinder blocks. The motor valve plate 17 is located between the center and motor cylinder blocks 40 and 38 and is supported by the motor eccentric shaft 33. The motor eccentric shaft is attached to the motor wobbler 13 so that the valve plate moves in a circular orbit as the motor wobbler rotates. Support for the cylinder block assembly is provided by the inventive compound hydrostatic bearings 21 and 24. The splined input shaft 18 drives the cylinder block assembly 11. Oil seals are located on opposite ends of the cylinder block assembly to prevent leakage of oil into the open areas of the transmission housing or to areas outside of the transmission.

The inventive compound hydrostatic bearing will now be explained with reference to FIGS. 3 to 7 which show the bearing enlarged and with somewhat greater detail.

Figure 3:
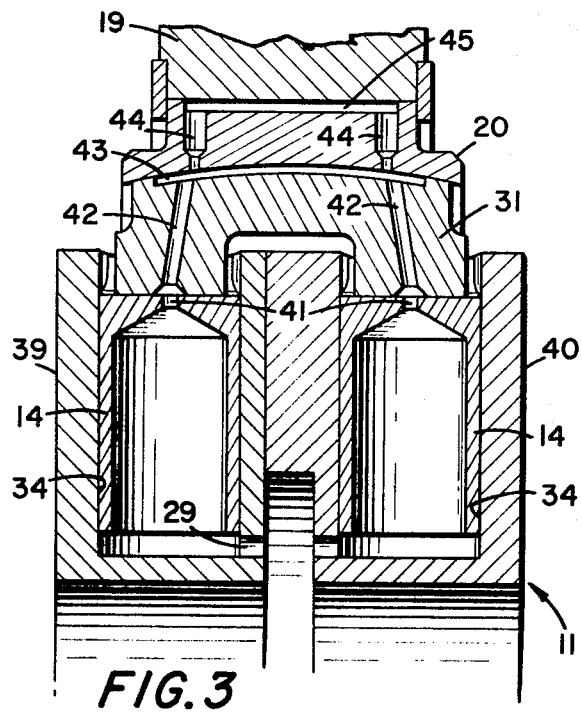
FIG. 3 is a section view of a two-piston-single pad assembly taken along line 3—3 of FIG. 2.

Shown in detail in FIG. 3 are two pistons with one swivel mounted pad forming a pad subassembly. This arrangement prevents rotation of the swivel pad about a single piston axis and keeps the arc of the pad in line with the inner arc of the bearing race. Pressurized fluid from the chambers 34 flows through the hollow pistons 15 and piston head orifices 41 to orifices 42 leading to a common recess 43 in the pad. The area of the recess 43 in the pad 31 is equal to the area of the two pistons 15 thus reacting the radial piston forces with the force from the pressurized fluid in the recess which provides pressurized lubrication between the pad bearing surface and the race. The pressurized fluid forming this first hydrostatic bearing is fed through restricted orifices 44 in the race to provide pressurized lubrication between the bearing surfaces of the bearing race and pump wobbler 19.

Figure 4:
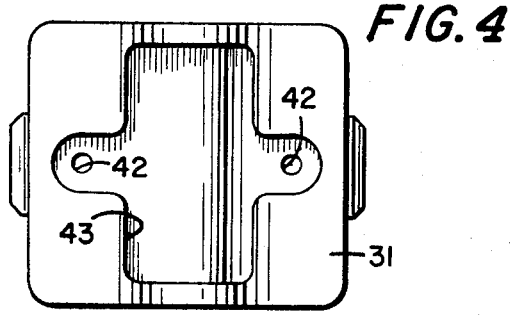
FIG. 4 is a top plan view of the pad shown in FIG. 3.

FIG. 4 shows the pad 31 in plan view. The shape and relative size of the recess can be noted from this figure.

Figure 6:
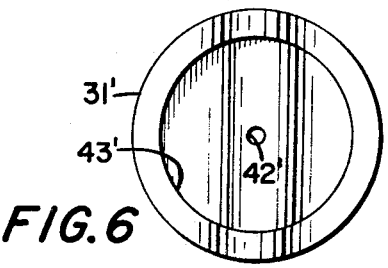
FIG. 6 is a top plan view of the pad shown in FIG. 5.
Figure 5:
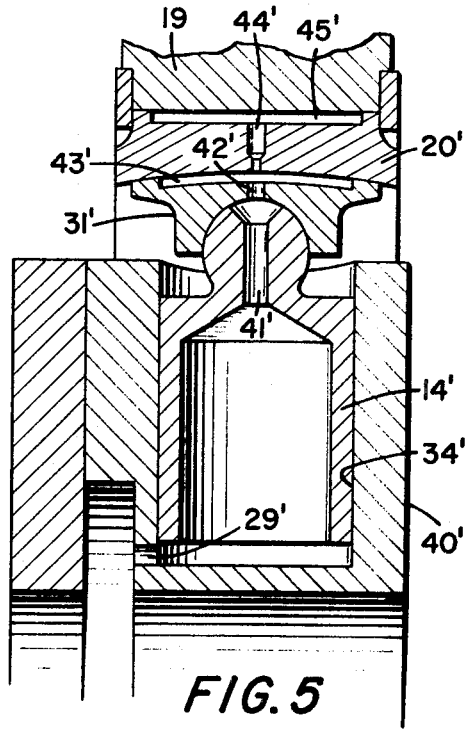
FIG. 5 is a section view similar to FIG. 3 showing a single piston-single pad assembly.

An alternate embodiment of the inventive compound hydrostatic bearing is shown in FIGS. 5 and 6 wherein a single radial piston 14 with oil passage 41' therein has a pad 31' pivotally mounted thereon and provided with a passage 42' and a recess 43' and a race 20' that rotates with the cylinder block and has multiple restricted orifices 44'. The inventive compound hydrostatic bearing is formed between the pad and race and between the race and wobbler in the same manner as mentioned above in connection with the double row of pistons.

Figure 7:
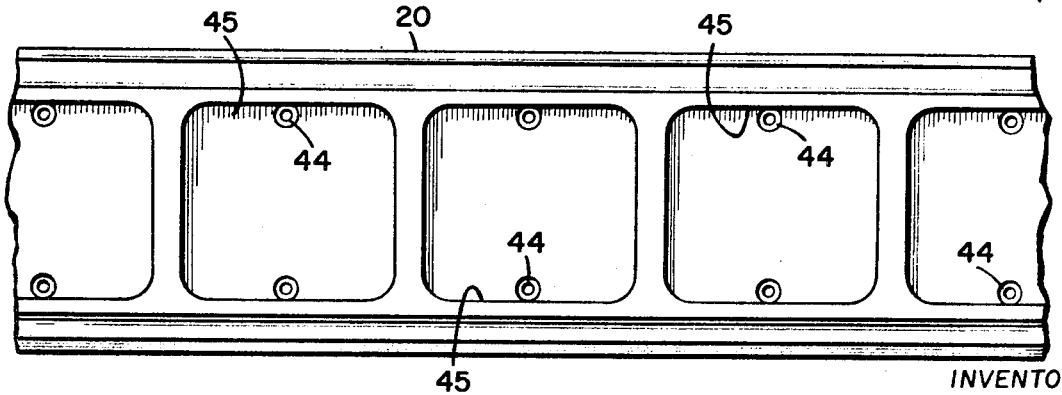
FIG. 7 is a partial top plan view of the race showing the recesses and restrictors in the race.

FIG. 7 shows a plan of the outer bearing surface of a race 20 showing the configuration of the recesses 45 formed sequentially therein.

Pressurized fluid from the cylinders 34 is fed through the oil passages to the pad recess 43. Thus, the pad forms part of the compound hydrostatic bearing but is specifically designed to provide still enough friction with the race to rotate the race with the cylinder block. Pressurized fluid is supplied to the race recesses 45 from the pad recesses 43 through appropriate restricted orifices 44 located in the race. Each pad recess communicates at all times with at least one of the restricted orifices for the race. Fluid pressure acts on the race recesses 45 located along the race periphery to support the vector sum of the applied load from all the pistonpad assemblies. Here the applied load is completely hydrostatically reacted and a pressurized fluid film at the race periphery prevents metal-to-metal contact between the race and wobbler. It is because there are actually two hydrostatic bearings in the same fluid series that the term "compound" was implemented.

The relative motion of the pads with respect to the race is due to the wobbler eccentricity and is oscillatory in nature. The relative sliding velocity between these parts is a function of the eccentricity magnitude and input speed. Because of this, the partial reaction of the applied bearing load, and the availability of good boundary lubrication, the interface PV factor is small and wear of the bearing should be negligible.

At startup and very low initial input speeds, some piston pad assemblies will be retracted due to their weight. No pressure buildup in the system occurs. As the cylinder block accelerates, the centrifugal force of the piston pad assemblies increases until it is sufficient to move the assemblies radially outward against the races. After all 18 piston pad assemblies of the pump and motor elements have been forced into contact with the races, the system charge pressure will increase to supply pressure fluid to the compound hydrostatic bearing system.

To avoid leakage due to misalignments between the relative moving parts, the bore of the races and top of the pads are matched with a spherical shape thus providing self-alignment between the race and pad bearing surfaces in case of angular misalignment or cylinder bores not in line. Side play between the pistons and pads compensates for axial misalignment between the wobbler and cylinder block.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore to be embraced therein.

What is claimed is:

1. A compound hydrostatic bearing for fluid operated radial piston machines, such as hydraulic motors, pumps, transmissions and the like, having a plurality of pairs of side-by-side radial pistons, a like plurality of hydrostatic pads each pad of which is mounted on one of said piston pairs, an annular race of sufficient width to span said piston pairs and adapted to carry the load thereof, and a housing, said compound bearing comprising a first hydrostatic bearing formed between said pads and an inner surface of said race and a second hydrostatic bearing formed between an outer surface of said race and said housing, means to feed operating fluid to said pistons, means to feed a portion of said fluid through said pairs of pistons and pads to fill said first bearing, means to feed a portion of the fluid from said first bearing through said race to fill said second bearing, wherein said first bearing reacts with the high radial forces of the piston pairs at low relative motion between bearing surfaces and the second bearing reacts the vector forces from the first bearing at high relative speed between surfaces at the outside of the race and the inside of the housing.

2. A compound hydrostatic bearing according to claim 1 further comprising a rotating cylinder block rotating within said race, said plurality of pairs of radial pistons being reciprocally mounted in said rotating cylinder block, said hydrostatic pads each having a recess therein directed towards said race, said feed means supplying pressurized lubricating fluid from a source externally of the bearing to said pairs of pistons, said race having a plurality of recesses formed in its outer surface and at least a like number of restricted orifices in said race connecting said race recesses to said first bearing, said race recesses providing full hydrostatic operation with a minimum of friction in the bearing housing, said pad recesses providing only partial hydrostatic operation to reduce friction in order to rotate the race of the second bearing with the cylinder block.

3. A compound hydrostatic bearing according to claim 2 wherein said race is circular in transverse section, and each pad is substantially rectangular in plan and has a spherical surface corresponding to the spherical inner surface of said race, each said pad being pivotally mounted on said piston pairs to provide self-alignment between the inner surface of the race and tilting of the rectangular shaped pad.

4. A compound hydrostatic bearing comprising an annular race, a rotating cylinder block mounted within said race and having a plurality of pairs of side-by-side radial pistons reciprocally mounted therein, a hydrostatic pad pivotally mounted on each pair of radial pistons, each said pad having a recess directed towards said race, said race having sufficient width to span said piston pairs and being adapted to carry the load thereof, means for providing pressurized lubricating fluid from an external source to a first bearing formed between said recesses in the pads and an inner surface of said race, a plurality of recesses in the outside surface of said race, at least a like plurality of restricted orifices through said race leading to said recesses, a housing having said race rotatable therein forming a second bearing therebetween, pressurized lubrication fluid from the first bearing passing through said restricted orifices to the race recesses, said race recesses being designed to provide full hydrostatic operation with a minimum of friction between the race and the housing, said pad recesses providing only partial hydrostatic operation to reduce friction in order to rotate the race with the cylinder block.

* * * * *